(12) United States Patent
Kremer et al.

(10) Patent No.: US 9,702,661 B2
(45) Date of Patent: Jul. 11, 2017

(54) ACCESSORY CAMERA FOR OPTICAL HUNTING SCOPES

(71) Applicant: Jakey Brooks Kremer, Scranton, AR (US)

(72) Inventors: Jakey Brooks Kremer, Scranton, AR (US); Luke Allen Reves, Russellville, AR (US); Akbar Rajani, Russellville, AR (US); Sergio Picado, London, AR (US)

(73) Assignee: Jakey Brooks Kremer, Scranton, AR (US)

( * ) Notice: Subject to any disclaimer, the term of this patent is extended or adjusted under 35 U.S.C. 154(b) by 77 days.

(21) Appl. No.: 14/824,359

(22) Filed: Aug. 12, 2015

(65) Prior Publication Data

US 2016/0047626 A1 Feb. 18, 2016

Related U.S. Application Data

(60) Provisional application No. 62/036,867, filed on Aug. 13, 2014.

(51) Int. Cl.

| F41G 1/00 | (2006.01) |
|---|---|
| F41G 1/38 | (2006.01) |
| G03B 29/00 | (2006.01) |
| G03B 17/02 | (2006.01) |
| F41G 1/46 | (2006.01) |
| F41G 3/16 | (2006.01) |
| F41G 3/26 | (2006.01) |
| G03B 17/48 | (2006.01) |

(52) U.S. Cl.
CPC .......... *F41G 1/38* (2013.01); *F41G 1/46* (2013.01); *F41G 3/165* (2013.01); *F41G 3/2611* (2013.01); *G03B 17/02* (2013.01); *G03B 17/48* (2013.01); *G03B 29/00* (2013.01)

(58) Field of Classification Search
None
See application file for complete search history.

(56) References Cited

U.S. PATENT DOCUMENTS

| 6,192,614 B1 | 2/2001 | Cliburn |
| 6,813,025 B2 | 11/2004 | Edwards |
| 7,437,848 B2 | 10/2008 | Chang |

(Continued)

*Primary Examiner* — Twyler Haskins
*Assistant Examiner* — Dwight C Tejano
(74) *Attorney, Agent, or Firm* — Stephen D. Carver

(57) ABSTRACT

An accessory for coupling to a conventional rifle scope captures sight images through the scope and transmits them through wi-fi to a remote location. The telescopic sight eyepiece is fitted into the front of a tubular portion of the accessory. An adjustable collet nut threadably and coaxially engages the scope eyelet. The scope image is transmitted through the housing from the front to a rear eyepiece through which the user can view images. The image passes through an optical splitter that directs duplicate images to an adjustable camera mounted on a slidable carriage disposed within the housing. A rack and pinion driven by a thumb wheel accessible from the housing exterior displaces the carriage for focusing. Processed camera images are delivered to a wi-fi circuit to transmit images to a remote Smart-phone, equipped with a suitable software program (i.e., an "app") for decoding the images and recording snapshots and movies.

9 Claims, 9 Drawing Sheets

(56) References Cited

U.S. PATENT DOCUMENTS

| | | |
|---|---|---|
| 8,045,038 B2 | 10/2011 | Holmberg |
| 2007/0214700 A1* | 9/2007 | Chang ................... F41G 1/32 42/119 |
| 2009/0205239 A1* | 8/2009 | Smith, III ............... F41G 1/38 42/122 |
| 2012/0046100 A1* | 2/2012 | Roman .................. F41G 1/467 463/30 |
| 2012/0055063 A1* | 3/2012 | Lindau .................. F41G 1/30 42/113 |
| 2013/0097912 A1 | 4/2013 | Craven |
| 2013/0188053 A1 | 7/2013 | Slevin |
| 2013/0229716 A1* | 9/2013 | Thomas ................. F41G 3/02 359/633 |
| 2013/0286216 A1 | 10/2013 | Lupher |
| 2013/0286239 A1 | 10/2013 | Lupher |
| 2015/0338191 A1* | 11/2015 | Maryfield .............. F41G 1/30 345/633 |

* cited by examiner

ACCESSORY CAMERA FOR OPTICAL HUNTING SCOPES

CROSS REFERENCE TO RELATED APPLICATION

This application is based upon, and claims priority from, prior pending U.S. Provisional Patent application Ser. No. 62/036,867 filed Aug. 13, 2014, and entitled Accessory Camera System for Optical Hunting Scopes, by inventors Jakey Brooks Kremer, Luke Allen Reyes, Akbar Rajani, and Sergio Picado, the entire disclosure of which is hereby incorporated by reference.

BACKGROUND OF THE INVENTION

I. Field of the Invention

The present invention relates generally to telescopic sights for long guns such as rifles or the like. More particularly, the present invention relates to accessory camera systems adapted to capture images through hunting scopes.

II. Description of the Prior Art

It has long been recognized by those skilled in the art that telescopic sites offer considerable, well recognized advantages to hunters and marksman. Typically such scopes are securely mounted atop a rifle, and they provide a telescopic image of a target within a viewing area. Simple scopes include objective and eyepiece lenses positioned at the ends of an elongated, tubular body. These lenses maintain the sealed integrity of the unit. Often scope magnification is user selectable, but many older scopes are fixed in magnification or power. Various forms of adjustable cross-hairs or aiming indicia are visible through the scope within the field of view, facilitating proper aiming. Scopes must be "sighted in" and most are capable of precision windage and elevation adjustments. Rifle scopes are typically mounted on firearms such that a precise relationship is established between the bore of the rifle barrel and the shooter's line of sight through the rifle scope. The goal is generally to have the point of aim for the scope match the point of impact for a particular type of ammunition at a known distance from the shooter.

Modern precision optical instruments include precision, high quality optics, and "bright" scopes provide an extremely high resolution view of the target area, even in low light conditions. Illuminated reticles or cross hairs have further enhanced scope usefulness during low-light periods such as dawn and dusk.

As scopes have improved in optics, brightness, adjustability and reliability, it is only natural that riflemen would seek to use them with cameras. Accordingly, a variety of devices for interfacing a camera or video system with a rifle scope have been proposed.

For example, U.S. Pat. No. 3,911,451 discloses a telescopic gun sight with a removable camera enabling an object to be photographed through the telescope. A beam splitter separates some of the light traveling along the axis of the scope and diverts it towards a collimator and a window in the wall of the telescope. The collimator provides parallel rays from this diverted light so that the camera attached to the mount can be a fixed focal-length.

U.S. Pat. No. 4,309,095 discloses a mounting device for securing a camera to a hunting rifle. The device comprises a first mounting bracket adapted to support a camera, a fastener to detachably secure a camera to the first bracket, a variable diameter clamp to clamp the first mounting bracket to the barrel of the telescope sight of a rifle, a cable release for remote actuation of the camera, a second mounting bracket connected to the cable release, and threaded fasteners for detachably securing the second mounting bracket to the trigger guard of a rifle.

U.S. Pat. No. 4,920,219 discloses a rifle having a telescopic sight for recording the target as seen through the telescopic sight at the instant the trigger is pulled. The apparatus includes a beam splitter for directing to a camera some of the light passing through the telescopic sight. The shutter mechanism of the camera is coupled to the rifle trigger so that the camera will "shoot" the picture of the target when the trigger is pulled. The camera is of the instant-copy type so that pictures of the target can be viewed shortly after "shooting". The apparatus thus enables the ability of a rifleman to be tested without the need for firing live ammunition.

U.S. Pat. No. 5,020,262 discloses a camera mount for use on a telescope in combination with a rifle. The mount is clamped onto the telescope, and has a camera attached to the top of the mount. A cable mechanism is attached at one end to the shutter release of the camera and at the other end to the trigger of the rifle. The camera is arranged to photograph the image received through the telescope and reflected through the mount. The cable mechanism provides means for controlling the operation of the camera. The viewfinder when the video camera recorder is recording video information on the recording medium.

U.S. Pat. No. 6,192,614 issued Feb. 27, 2001 discloses a video camera and mounting system for a firearm, such as a rifle or a shotgun, to video a target. A video mounting assembly incorporates a shock absorbing mechanism to protect the video camera against the recoil of the firearm, and a pivotally mounted platform to finely adjust the video camera toward the target.

U.S. Pat. No. 6,813,025 issued Nov. 2, 2004 provides a viewing scope adapted to be mounted on a rifle. The scope includes a body module, an objective module, a test module, and a control module. The test module may be configured to test the performance of the scope. The control module may include a series of user inputs that can be accessed and activated by a user without requiring the user to move his or her visual focus from the scope.

U.S. Pat. No. 7,437,848 issued Oct. 21, 2008 discloses a compound firearm aiming and photographing apparatus. A digital sight is disposed on a firearm body and includes an image processing module and a receiver electrically connected thereto. A remote-control transmitter is connected to the firearm body, emitting a signal monitored by a receiver that actuates an image processing module.

U.S. Pat. No. 8,045,038 issued Oct. 25, 2011 discloses camera for mounting to a weapon including a housing, a camera lens, a video recorder, a cover, and a mounting rail. The camera lens is located at a front end of the housing. The video recorder is located within the housing for recording images captured by the camera lens. The cover is coupled to a rear end of the housing for accessing components located within the housing and the mounting rail extends along an exterior surface of the housing and mounts the camera to the weapon.

U.S. Pat. Publication No. 2013/0097912 published Apr. 25, 2013 discloses a viewing apparatus for a rifle scope that comprises a camera and means for attaching the camera to a rifle scope such that the camera is exposed to an image visible at an eyepiece of a rifle scope. The camera is adapted to generate data from the image to which it is exposed, and transfers image data from the camera to a display unit. An attachment means mounts the display unit to a rifle scope.

U.S. Pat. Publication No. 2013/0188053 discloses an electronic system and method for a gun-mounted camera. A digital zoom maintains a native pixel count by with a special sensor. Processing includes decimating an image for low magnification and windowing the image for higher magnification.

U.S. Pat. Publication No. 2013/0286216 published Oct. 31, 2013 discloses a rifle scope including a circuit for tracking a target. The device comprises at least one optical sensor capturing a video of a view area, a display, a processor coupled to the display and to the optical sensor, and a memory accessible to the processor. The memory stores instructions that, when executed, cause the processor to receive user input that identifies a target within the video, apply a visual tag to the target within the video, and adjust the visual tag to track the target within a sequence of frames. The memory further stores instructions that, when executed, cause the processor to provide the video including the visual tag to the display.

U.S. Pat. Publication No. 2013/0286239 printed Oct. 31, 2013 discloses a rifle scope including a display, at least one optical sensor to capture video of a view area, and image processing circuitry coupled to the display and the at least one optical sensor. The image processing circuitry is configured to select visual elements within a sequence of frames of the video and to align the visual elements within adjacent frames of the sequence of frames to produce a video output corresponding to the view area that is stabilized relative to a target. The image processing circuit is configured to provide the video output to the display.

Nevertheless there has not been a highly adaptable portable converter or adapter for use with optical telescopic sights that generates and transmits optical scope images to remote locations, while concurrently allowing the hunter or user to view potential targets though the scope without interference from the camera apparatus.

SUMMARY OF THE INVENTION

The instant invention comprises an accessory adapted to be coupled to conventional hunting or rifle scopes for capturing snapshots or movie images through the telescopic sight. The telescopic sight eyepiece is fitted into the front of the accessory so that a telescopic scope image that may be viewed and sampled is transmitted by wi-fi to a remote Smart-phone.

The camera accessory comprises a rigid, box-like plastic housing that encloses internal parts. The accessory bottom is substantially tubular, comprising a front mated to the scope, and a rear through which the user may view telescopic images. An external collet nut threadably coupled to the housing coaxially engages the scope eyelet. Firm positioning for a variety of scopes is established by a deformable, gripping collet functioning as a shim is coaxially and compressively sandwiched between the scope and the collet nut. The scope image is transmitted through the housing tubular portion from the front connection with the scope to a rear eyepiece through which the user can look at images.

In the optical pathway through the accessory, there is a reflective mirror splitter assembly, that directs duplicate images upwardly through the housing to an adjustable camera which is mounted on a slidable carriage disposed within the housing. A rack and pinion arrangement, driven by a thumb wheel accessible from the housing exterior, displaces the carriage for focusing the camera. An associated image processing circuit and wi-fi transmitting circuit transmits images to a remote Smart-phone, which may be equipped with a suitable software program (i.e., an "app") for decoding the images and recording snapshots and movies.

Accordingly, a basic object of this invention is to photographically capture images from a telescopic device such as an optical firearm scope, binoculars, small telescopes and the like.

Another fundamental object is to provide a camera accessory for capturing images through hunting scopes without interfering with normal scope use.

Another basic object is to provide an adaptor of the character described that can connect to a variety of hunting scopes, that allows a user to see through the scope, while the viewed scope images are concurrently captured by the adaptor and transmitted for remote viewing.

Another basic object is to mount a miniature camera on a rifle and capture telescopic scope images without interfering with the use of the firearm or the accuracy of the scope.

A related object is to provide a quick-connect and quick disconnect camera accessory for rifle scopes that enables scope images to be captured, without interfering with scope access or visibility.

It is also an object to provide an accessory adaptor of the character described that is adapted to concentrically fit a large variety of scopes.

Similarly it is an object to facilitate taking pictures of wildlife and the like through an optical rifle scope.

A related object of the present invention to enable pictures to be taken through a rifle scope without blocking or interfering with the normal view of the rifleman or hunter.

Another basic object is to enable the simultaneous use of a miniature camera with a telescopic rifle scope while hunting.

Another object of this invention is to provide a WI-FI link for an adaptor of the character described, so that a Smart-phone disposed reasonably close to the adaptor can receive, process and store the photographic images derived by the adaptor through the scope of the rifle.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
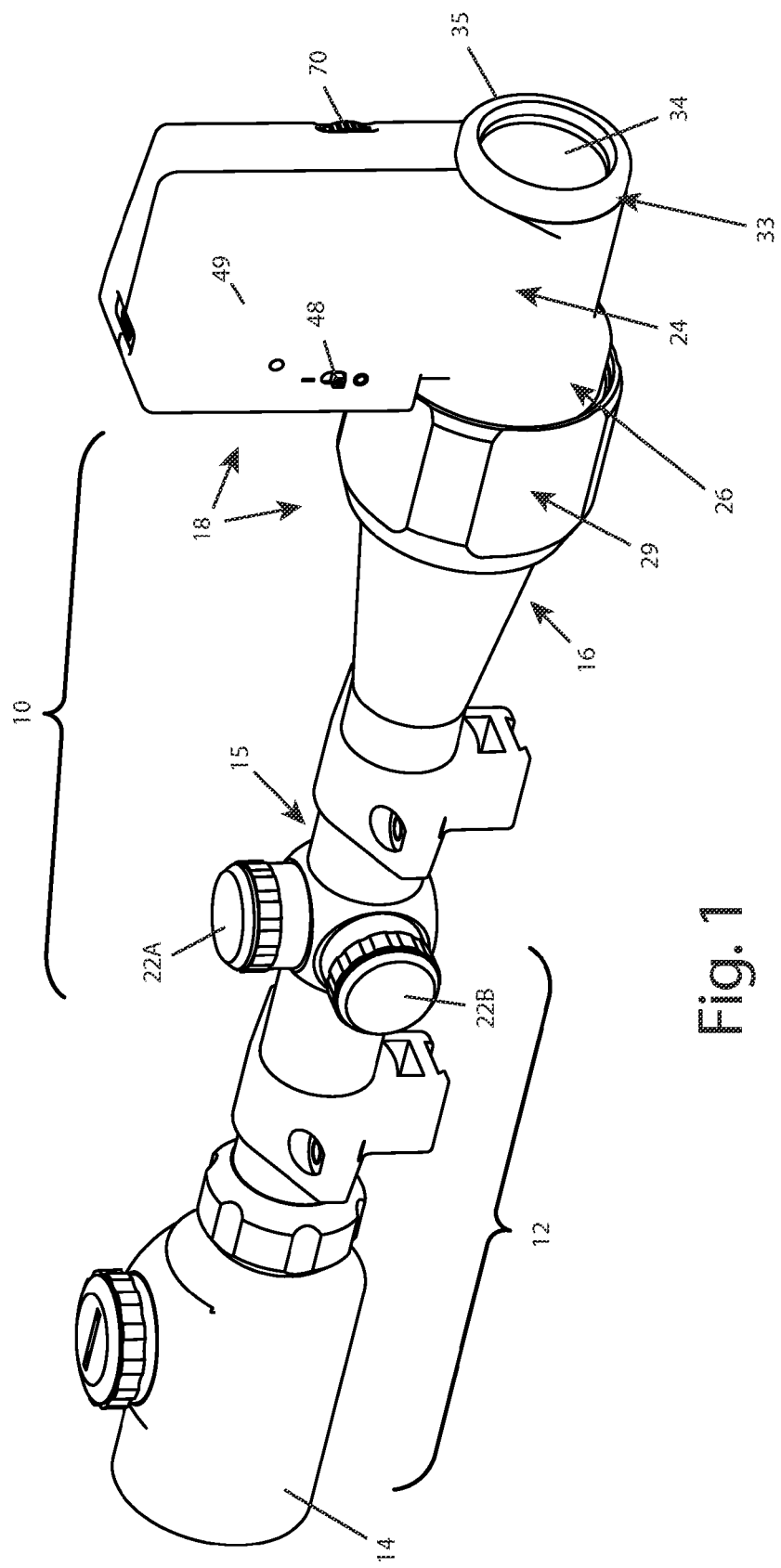
FIG. 1 is an isometric assembly view showing the accessory camera system fitted to a conventional, telescopic rifle scope.

With initial reference now directed to FIG. 1 of the appended drawings, a conventional telescopic sight fitted with our new camera accessory has been collectively designated by the reference numeral 10. The rifle scope 12 is conventional, including a frontal object lens 14 fitted at the extreme end of an elongated, hollow, tubular body 15. The eyepiece 16 is spaced apart from the lens 14 at the other end of the tubular scope body 15. The camera accessory 18, constructed in accordance with the invention, as detailed below, is fitted to the scope eyepiece 16. Scope 12 can be adjusted in power by varying magnification with conventional adjustments, and conventional azimuth and elevation adjustment knobs 22A and 22B are provided on scope body 15 between the frontal lens 14 and the eyepiece 16 to sight in the scope.

With additional reference directed now to FIGS. 2-10, the preferred camera accessory 18 comprises a rigid, preferably molded, two-piece plastic housing 24 that functions as a protective enclosure for internal parts described hereinafter. The front of the accessory 18 mounts over the viewing end of the hunting scope 12, and the rear of the accessory 18 forms an eyepiece through which the viewer can look through the scope 12. The scope image so viewed will be captured by the camera apparatus and relayed via Wi-fi to a remote smart phone as described below.

Figure 10:
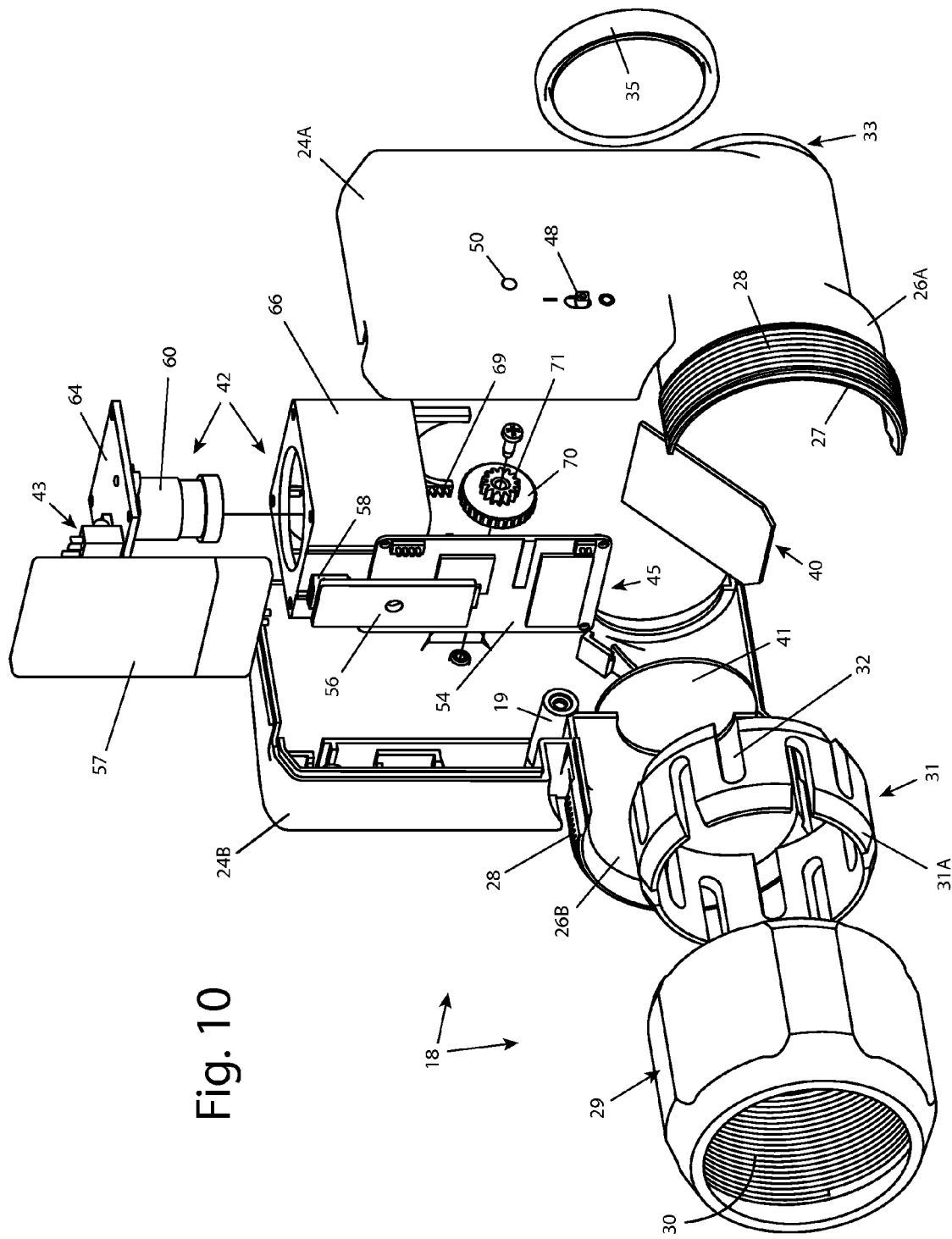
FIG. 10 is an enlarged, exploded fragmentary isometric view thereof.

In FIG. 10 the two complementary halves of the housing 24 respectively designated 24A and 24B are adapted to be coupled together to form the assembled housing 24, which is generally in the form of a substantially hollow, parallelipiped when assembled. Internal bosses 19 (FIG. 10) anchor suitable fasteners for assembly. The housing 24 includes an integral, lower tube portion generally designated by the reference numeral 26, comprising complementary halves 26A and 26B (FIG. 10) integrally associated with housing halves 24A and 24B respectively. Frontal tube portion 26A has a circular leading edge portion 27 (FIG. 10) with external threads 28 for coaxially receiving an external collet nut 29. The internal threads 30 (FIG. 10) of collet nut 29 mate with threads 28 on the lower tube 26. The collet nut 29 receives the eyepiece 16 of the rifle scope 12. In assembly, a gripping collet 31 is preferably coaxially secured between collet nut 29 and tube 26 as a shim, for pressuring and adapting to telescopic sights of slightly different diameters.

The tubular gripping collet 31 has a plurality of staggered, radially spaced apart notches 32 projecting inwardly from both of its chamfered ends 31A at regular intervals to aid in flexibility. Gripping collet 31 coaxially surmounts the scope eyepiece, and functions as a shim in response to the collet nut 29.

A viewing end at the rear of the accessory 18 has been generally designated by the reference numeral 33 (FIGS. 1, 10). Images from the scope 12 are viewable through a viewing aperture 34 (i.e., FIGS. 1, 4), which is circumscribed by a round eyepiece end cap 35 at the rear end of tube 26 at the housing rear.

Disposed within the tube portion 26 of the plastic housing 24 is a 25/75 reflective mirror assembly, generally designated by the reference numeral 40. The mirror assembly functions as an optical splitter. Preferably it is a half silvered mirror functioning as a beam splitter allowing the use to see the original image coming from the scope as well as directing a part of that image into the digital camera. An internal camera assembly, generally designated by the reference numeral 42, is disposed within housing 24 in the parallelipiped region of the enclosure, above the beam splitter mirror 40. The Camera assembly 42 is commercially available, and is preferably a digital camera with its own lens system that digitally transmits video. Images derived from the scope 12 (FIG. 1) are passed through the accessory 18, traveling through the accessory front through tube 26 and collet nut 29 towards the user viewing end 33 at the rear of the accessory 18 (i.e, FIG. 6). Images pass through the reflective mirror assembly 40 through a translucent protective cover 41 (FIG. 10) towards the viewing end 33, where they may be observed by a hunter or user. However, the scope images are "split" by assembly 40, with images redirected upwardly (i.e., as viewed in FIG. 10) towards the internal camera assembly 42. Upwardly directed images captured from the scope 12 through the internal beam splitting mirror system 40 are processed by an image circuit 43 and wi-fi circuit 45 within housing 24 (FIG. 10). The wi-fi processing circuitry 45 is a unit that allows the unit to be it's own server with its own hotspot coverage area of about 20 meters. This allows wi-fi capability in any area and allows a multitude of viewers to see the same image.

Figure 2:
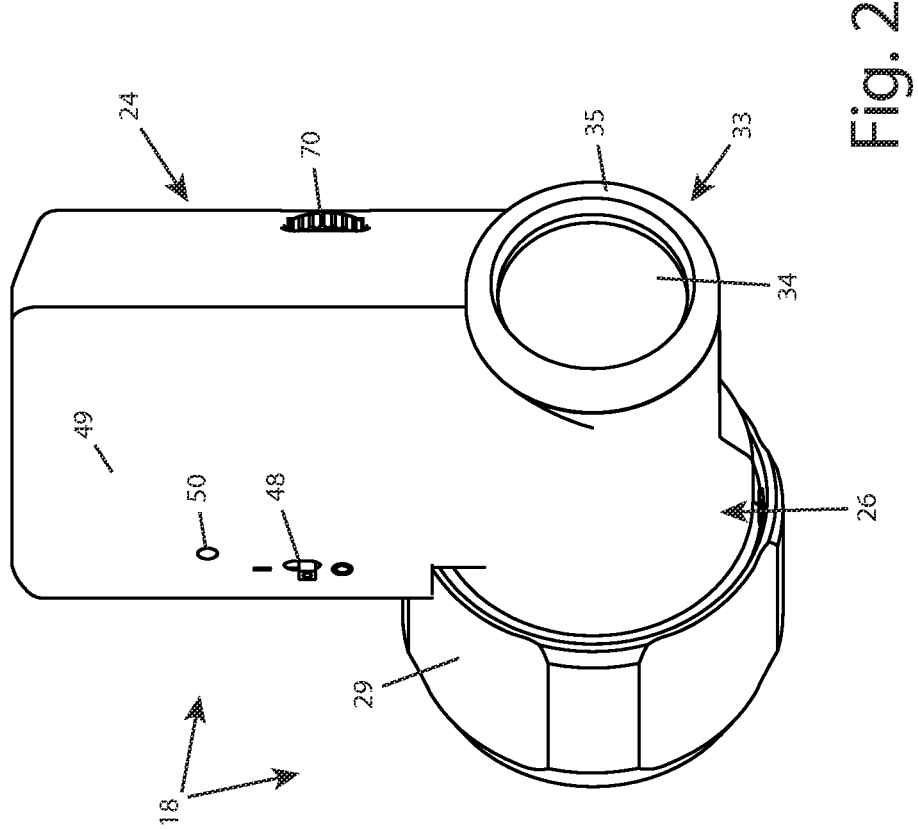
FIG. 2 is an enlarged, rear isometric view of the accessory camera system.

The camera assembly 42 and the associated image processing circuit 43 and wi-fi transmitting circuit 45 are controlled by an on/off power switch 48 accessible from the left side 49 of the housing 24 (FIGS. 1, 2, 10). Switch 48 is spaced apart from a "power on" indicator LED 50. Circuitry 45 comprises a wi-fi transmitter board 54 which includes a USB charging module 56 (FIG. 10). A lithium battery 57 is disposed within the frontal, upward volume of the housing 24. A USB charging port 58 (i.e., FIGS. 5, 10) is positioned at the top of the housing 24 for convenient access.

Figure 6:
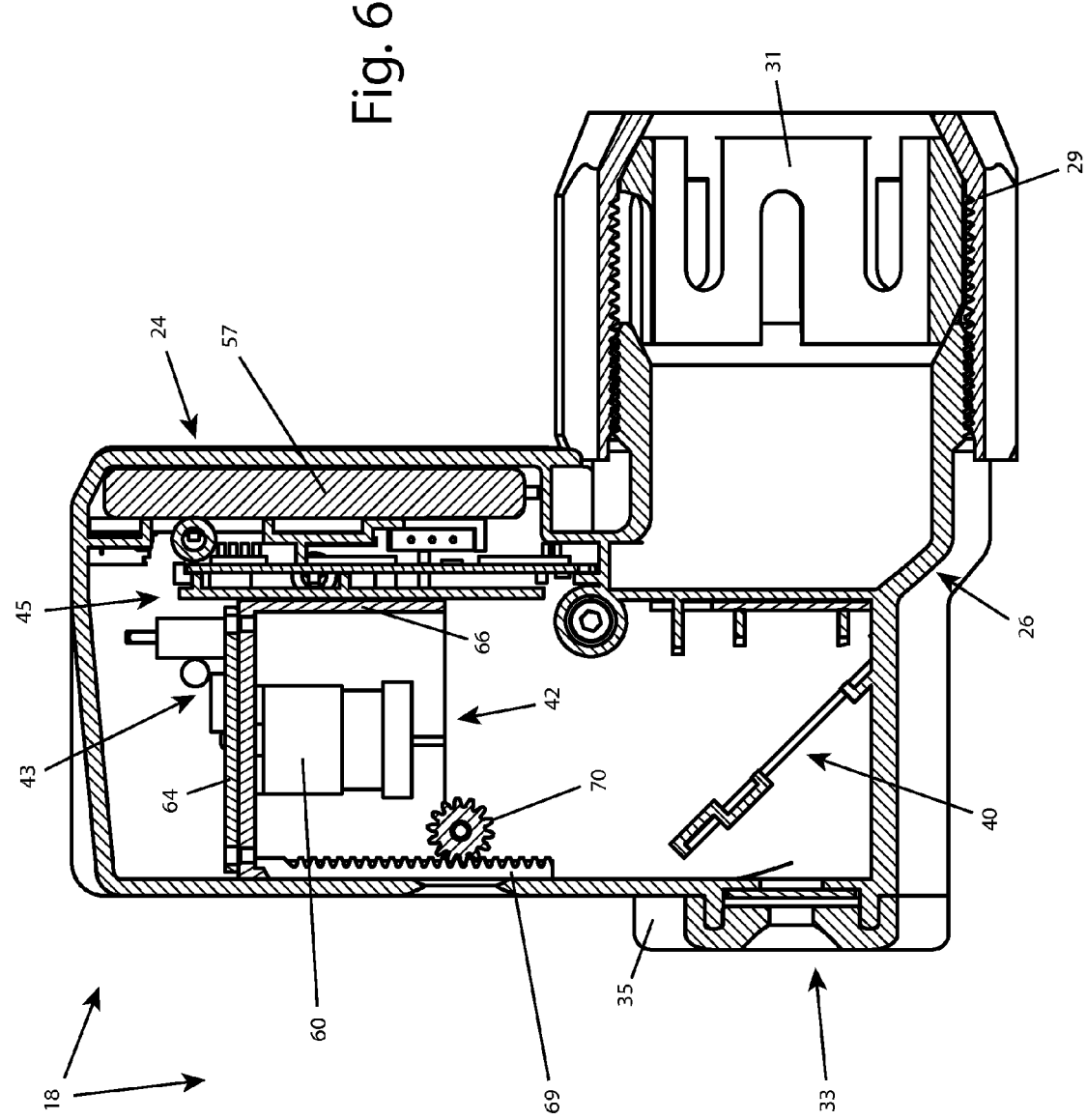
FIG. 6 is a sectional view taken generally along lines 6-6 of FIG. 4 in the direction of the arrows.
Figure 7:
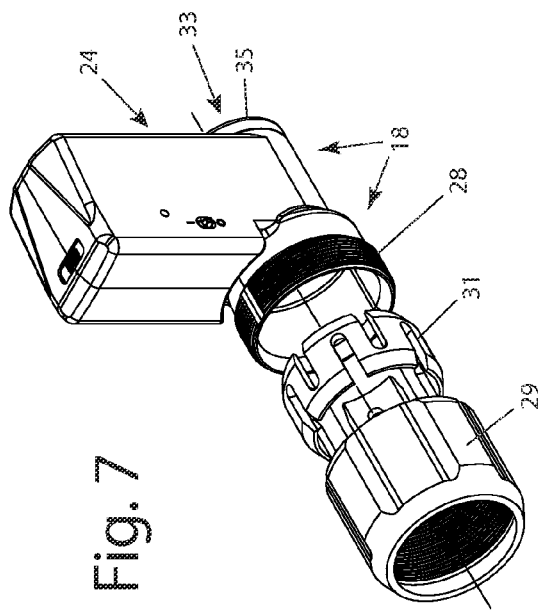
FIG. 7 is an exploded frontal isometric view thereof.
Figure 9:
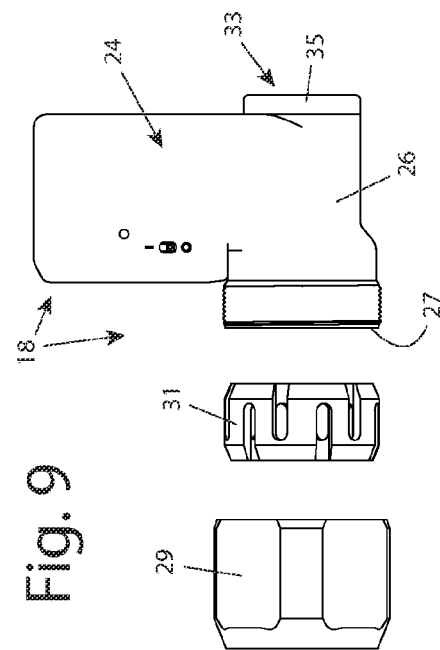
FIG. 9 is an exploded side elevational view.
Figure 8:
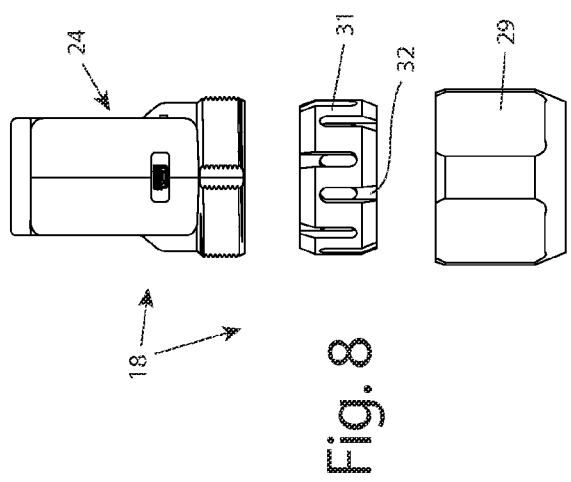
FIG. 8 is an exploded top plan view.
Figure 11:
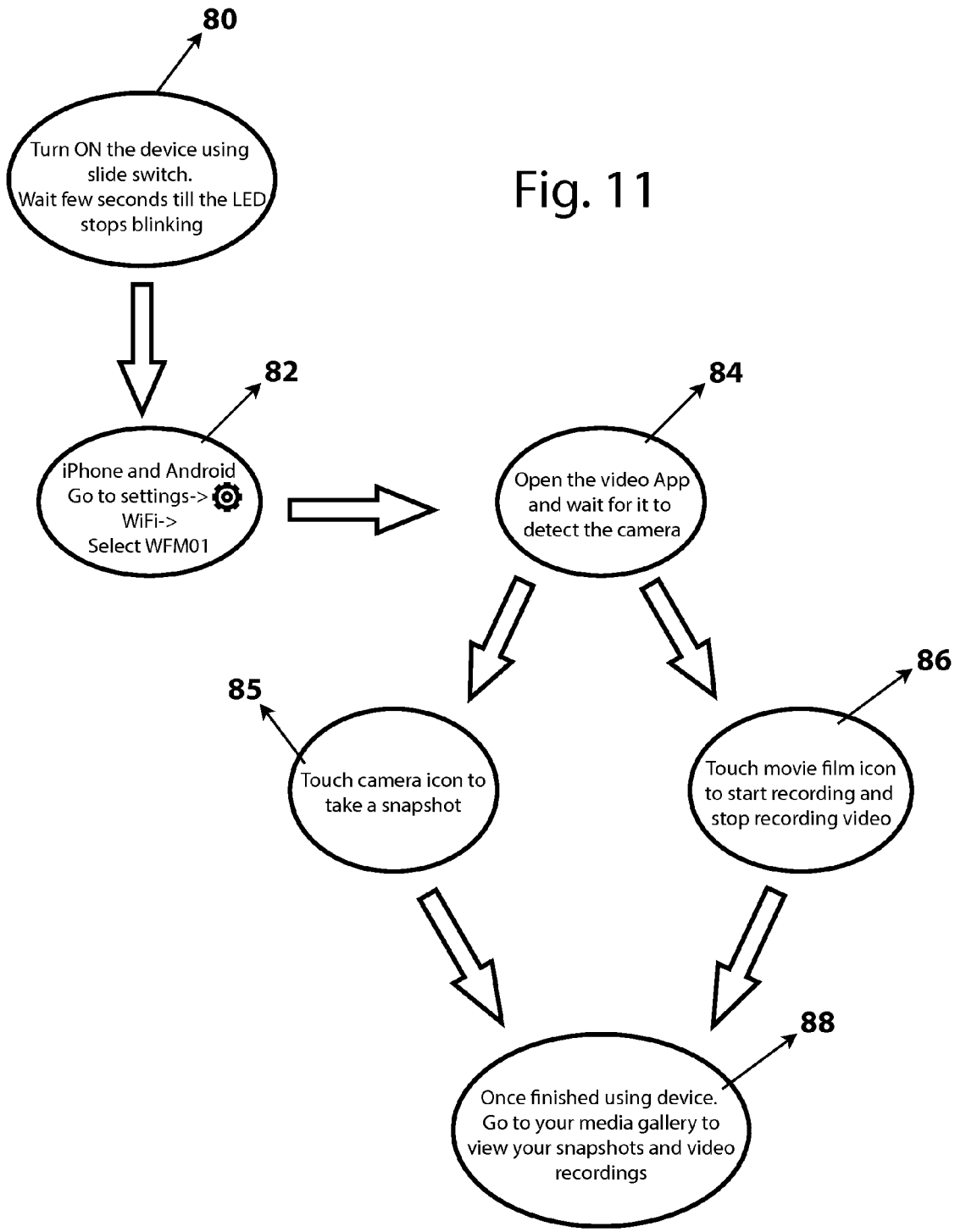
FIG. 11 is a diagrammatic flow chart illustrating operation.

The camera assembly 42 (i.e., FIGS. 6 and 10) captures images transmitted by the mirror beam splitter 40 and electronically decodes them in the associated image processing circuitry 43 (FIG. 6). The camera assembly 42 comprises a camera module 60 projecting downwardly from the camera circuitry board 64, which is interiorly mounted atop a displaceable camera carriage 66 of generally cubicle proportions. One side of the camera carriage 66 includes an elongated gear rack 69 that is controlled by a gear thumb wheel 70 that is accessible externally of the housing 24 (i.e., FIGS. 1, 2). Thumb wheel 70 is coaxial with a reduced diameter pinion gear 71 (FIG. 1)) that meshes with the rack 69 and provides reduction gearing. As the wheel 70 is adjustably rotated, the gear 71 driven by wheel 70 displaces the rack 69 and the camera carriage to which it is attached. The thumb wheel 70 thus displaces the camera module 60 vertically upwardly and/or downwardly (as viewed in FIG. 10) within housing 24 to focus the captured image. After processing in the camera module circuitry 43, the image is transmitted to the wi-fi circuitry for wireless relaying to a remote cell phone or receiver for viewing and/or capturing and/or recording. Preferably a smart phone that receives the wi-fi signal will employ a software "app" referenced in FIG. 11.

In operation, the accessory 18 is first mated with the telescopic scope 12, as in FIG. 1 wherein the scope viewing eyepiece coaxially inserted within the collet nut 29, which is thereafter gently rotated for tightening. The gripping collet 31 (FIG. 10) aids in gently mating the telescopic scope and the accessory 18 together. At this time images from the telescopic scope 12 will be available to the viewer at the rear viewing end 33 of the accessory 18. Hunting or sighting may progress substantially as normal without activating the accessory 18. However, at this time the process of FIG. 11 may be implemented.

Figure 3:
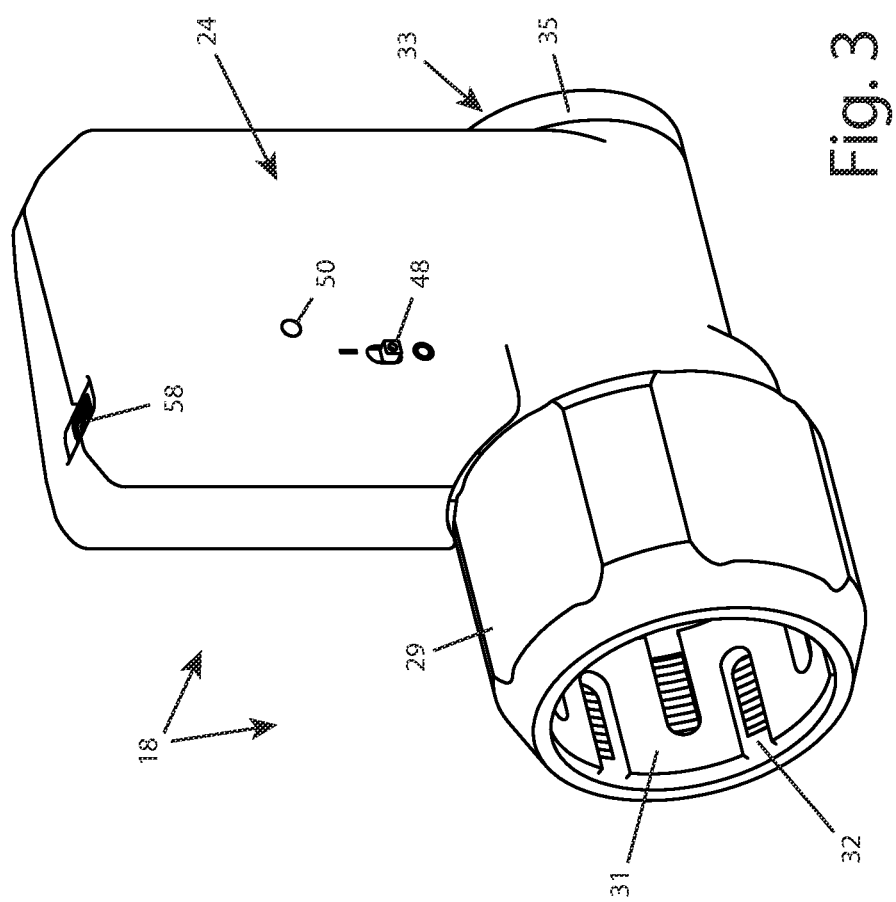
FIG. 3 is an enlarged, front isometric view of the accessory camera system.
Figure 4:
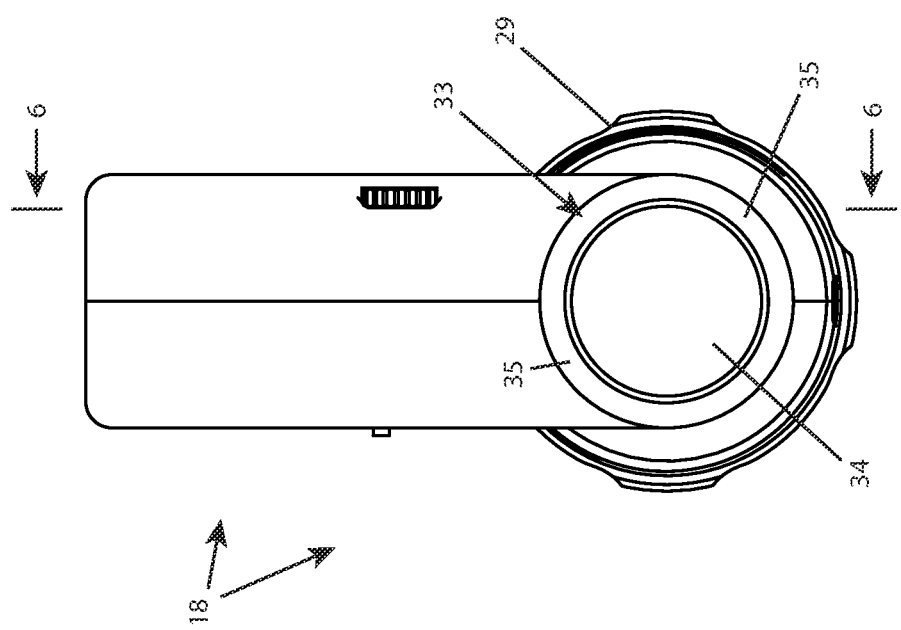
FIG. 4 is a rear elevational view of the camera accessory.
Figure 5:
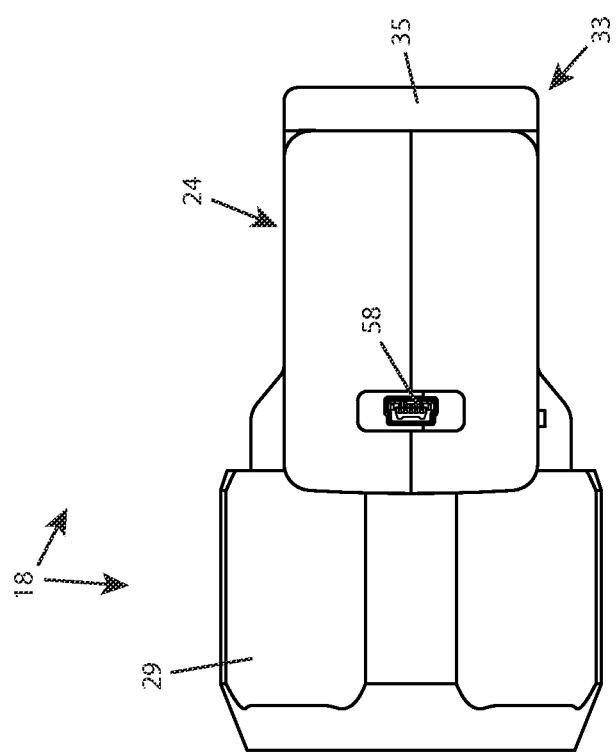
FIG. 5 is a top plan view of the camera accessory.

The first step 80 is implemented by turning on the accessory with switch 48 (FIG. 3). Preferably the user will wait for initialization, with readiness indicated by LED 50 that will blink momentarily. In step 82 a Smart-phone "app" will be activated on the phone screen in the "settings" menu, and a wi-fi mode will be selected. In step 84 the internal accessory camera transmissions will be detected. When the image appears on the phone screen, the camera can be focused with thumb wheel 70.

In step 85 a camera icon on the Smart-phone may be touched to take a snap shot, which will be the image addressed by the scope 12. In alternate step 86 an icon may be depressed to start recording a movie. After steps 85 or 86 the media gallery within the Smart-phone may be addressed in step 88 to view snapshots or movies recorded by the smart-phone with the aid of the accessory 18.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. An accessory for attachment to a telescopic scope, the accessory comprising:
   a rigid housing for enclosing internal parts, the housing comprising a front portion for coupling the housing to said scope and a rear portion through which a user may see through said scope;
   an optical pathway defined through said housing between said housing front portion and said housing rear portion, said housing comprising a substantially tubular portion through which said optical pathway is defined;
   the housing rear comprising a viewing aperture through which a user may see through said scope;
   wherein said housing tubular portion has a front extending from said housing front and said tubular portion has a rear at said housing rear, the tubular portion rear having said viewing aperture, and said tubular portion front comprising a collet nut threadably mated to said housing for coaxially engaging said telescopic scope;
   an optical splitter disposed within said housing in said optical pathway for deriving an image from said scope and redirecting it;
   a camera assembly disposed within the housing for receiving an image from said optical splitter and delivering an output;
   an image circuit for processing said camera output;
   a wi-fi transmitting circuit connected to said image circuit for transmitting images remotely; and,
   whereby snapshots and movies derived from said scope may be remotely viewed and stored.

2. The accessory as defined in claim 1 further comprising a deformable, gripping collet coaxially and compressively disposed between said collet nut and said scope for providing a shim.

3. The accessory as defined in claim 1 wherein said camera assembly comprises a camera adjustably mounted on a slidable carriage disposed within the housing, and said housing comprises means for adjusting said carriage to focus said camera.

4. The accessory as defined in claim 3 wherein said means for adjusting said carriage comprises a rack and pinion driven by a thumb wheel accessible from the housing exterior.

5. The accessory as defined in claim 4 wherein said housing comprises a substantially tubular portion through which said optical pathway is defined, wherein said tubular portion has a front extending from said housing front and said tubular portion has a rear at said housing rear, the tubular portion rear having said viewing aperture, and said tubular portion front comprising a collet nut threadably mated to said housing for coaxially engaging said telescopic scope.

6. An accessory for attachment to a telescopic scope, the accessory comprising:
   a housing generally in the form of a substantially hollow, parallelepiped for enclosing internal parts, the housing comprising an integral lower tube portion having a front for coupling the housing to said scope and a rear through which a user may see through said scope;
   an optical pathway defined through said housing tubular portion between said tube front and said tube rear;
   the tube rear comprising a viewing aperture through which a user may see through said scope;
   the tube front comprising a collet nut threadably coupled thereto for compressively coaxially engaging said scope;
   a deformable, gripping collet coaxially and compressively disposed between said collet nut and said scope for providing a shim;
   an optical splitter disposed within said tube portion in said optical pathway for deriving an image from said scope and redirecting it;
   a camera assembly disposed within the housing above said tube portion for receiving an image from said optical splitter and delivering an output;
   an image circuit for processing said camera output;
   a wi-fi transmitting circuit connected to said image circuit for transmitting images remotely; and,
   whereby snapshots and movies derived from said scope may be remotely viewed and stored.

7. The accessory as defined in claim 6 wherein said gripping collet has a pair of chamfered ends and a plurality of staggered, radially spaced apart notches projecting inwardly from both of its chamfered ends.

8. The accessory as defined in claim 6 wherein the camera assembly comprises an interiorly mounted, displaceable camera carriage, the carriage comprising an elongated gear rack controlled by an external, manually accessible gear thumb wheel for displacing the carriage to focus the camera.

9. An accessory for attachment to a telescopic scope, the accessory comprising:
   a housing generally in the form of a substantially hollow, parallelepiped for enclosing internal parts, the housing comprising an integral lower tube portion having a front for coupling the housing to said scope and a rear through which a user may see through said scope;
   an optical pathway defined through said housing tubular portion between said tube front and said tube rear;
   the tube rear comprising a viewing aperture through which a user may see through said scope;
   the tube front comprising a collet nut threadably coupled thereto for compressively coaxially engaging said scope;

an optical splitter disposed within said tube portion in said optical pathway for deriving an image from said scope and redirecting it;

a camera assembly disposed within the housing above said tube portion for receiving an image from said optical splitter and delivering an output;

an image circuit for processing said camera output;

a wi-fi transmitting circuit connected to said image circuit for transmitting images remotely;

whereby snapshots and movies derived from said scope may be remotely viewed and stored; and, wherein the camera assembly comprises an interiorly mounted, displaceable camera carriage, the carriage comprising an elongated gear rack controlled by an external, manually accessible gear thumb wheel for displacing the carriage to focus the camera.

* * * * *